United States Patent

Uemura

[11] Patent Number: 5,164,028
[45] Date of Patent: Nov. 17, 1992

[54] RADIAL TIRE

[75] Inventor: Yoshiaki Uemura, Kobe, Japan

[73] Assignee: Sumitomo Rubber Industries, Ltd., Hyogo, Japan

[21] Appl. No.: 602,641

[22] Filed: Oct. 24, 1990

[30] Foreign Application Priority Data

Oct. 27, 1989 [JP] Japan .................. 1-280044

[51] Int. Cl.⁵ .............................. B60C 9/18
[52] U.S. Cl. ...................... 152/527; 152/532
[58] Field of Search ........... 152/526, 527, 532, 535

[56] References Cited

U.S. PATENT DOCUMENTS

| 4,262,726 | 4/1981 | Welter | 152/532 |
| 4,962,802 | 10/1990 | Rohde | 152/532 |

FOREIGN PATENT DOCUMENTS

| 0227107 | 4/1963 | Austria | 152/532 |
| 3329837 | 2/1985 | Fed. Rep. of Germany | 152/532 |
| 0051504 | 3/1982 | Japan | 152/209 R |
| 61-36002 | 2/1986 | Japan . | |
| 62-85703 | 4/1987 | Japan . | |
| 0141103 | 6/1989 | Japan | 152/527 |

Primary Examiner—Michael W. Ball
Assistant Examiner—Nancy T. Krawczyk

[57] ABSTRACT

A radial tire comprises: a pair of bead cores disposed one in each bead portion of the tire; a carcass having radially arranged cords turned up around the bead cores form the axially inside to the outside thereof; a rubber tread disposed radially outside the carcass; a belt comprising a wider ply and a narrower ply disposed adjacently between the carcass and the tread, each belt ply comprising parallel metallic cords each composed of at most five metallic strands, each strand having a diameter of in a range of 0.10 mm to 0.22 mm, the cord count in each belt plies being in a range of 25 to 45 cords/5 cm in a direction at a right angle to the cord direction; and a rubber damper layer disposed between said adjacent belt plies, the damper layer having a substantially uniform thickness so that the distance between the cords of one belt ply and the cords of the other belt ply is in a range of 2.0 mm to 3.0 mm, and the damper layer having a width being not more than the wider belt ply width and not less than the narrower belt ply width.

2 Claims, 2 Drawing Sheets

RADIAL TIRE

The present invention relates to a belted radial ply tire being able to improve ride comfort, which is suitably applied to passenger car tires.

BACKGROUND OF THE INVENTION

Recently, belted radial tires provided with a steel cord belt are generally used from a point of view of tire performance such as durability, steering stability, wear resistance and the like, and the tires have a tendency toward lower aspect ratio in order to further improve the tire performance. However, ride comfort of vehicles is apt to be impaired when the aspect ratio is lowered.

As a means to improve ride comfort, it has been proposed to decrease tread pattern rigidity by Japanese Patent Publication JP-A-61-36002. Further, in Japanese Patent Application No. 60 225974, it has been proposed to use organic fiber cords for the belt.

However, the former has a problem that wear resistance and steering stability are deteriorated, and the later has a problem that the uniformity of the tire is disturbed and tire making processes become complex.

SUMMARY OF THE INVENTION

It is, therefore, an object of the present invention to provide a radial tire which can improve the ride comfort of vehicles without deteriorating the tire performance.

According to one aspect of the present invention, a radial tire comprises:

a pair of bead cores disposed one in each bead portion of the tire;

a carcass having radially arranged cords turned up around the bead cores from the axially inside to the outside thereof;

a rubber tread disposed radially outside the carcass;

a belt comprising a wider ply and a narrower ply disposed adjacently between the carcass and the tread, each belt ply comprising parallel metallic cords each composed of at most five metallic strands having a diameter of not less than 0.10 mm and not more than 0.22 mm, the cord count in each of the belt plies being in a range of 25 to 45 cords/5 cm in a direction at a right angle to the cord direction; and a rubber damper layer disposed between said adjacent belt plies, the damper layer having a substantially uniform thickness so that the distance between the cords of one belt ply and the cords of the other belt ply is in a range of 2.0 mm to 3.0 mm, and the damper layer having a width being not more than to the wider belt ply width and in a range of the narrower belt ply width.

Preferably, the complex elastic modulus (E*) of the rubber damper layer is set to be in a range of 50 kgf/sq.cm to 75 kgf/sq.cm, and the complex elastic modulus (E*) of the tread rubber is set to be in a range of 40 kgf/sq.cm to 55 kgf/sq.cm, and further the JIS(A) hardness of the tread rubber at a temperature of 20 degrees C. is set to be in a range of 45 to 57.

BRIEF DESCRIPTION OF THE DRAWINGS

An embodiment of the present invention will now be described in detail with reference to the accompanying drawings, in which.

DETAILED DESCRIPTION OF THE EMBODIMENT

Figure 1:
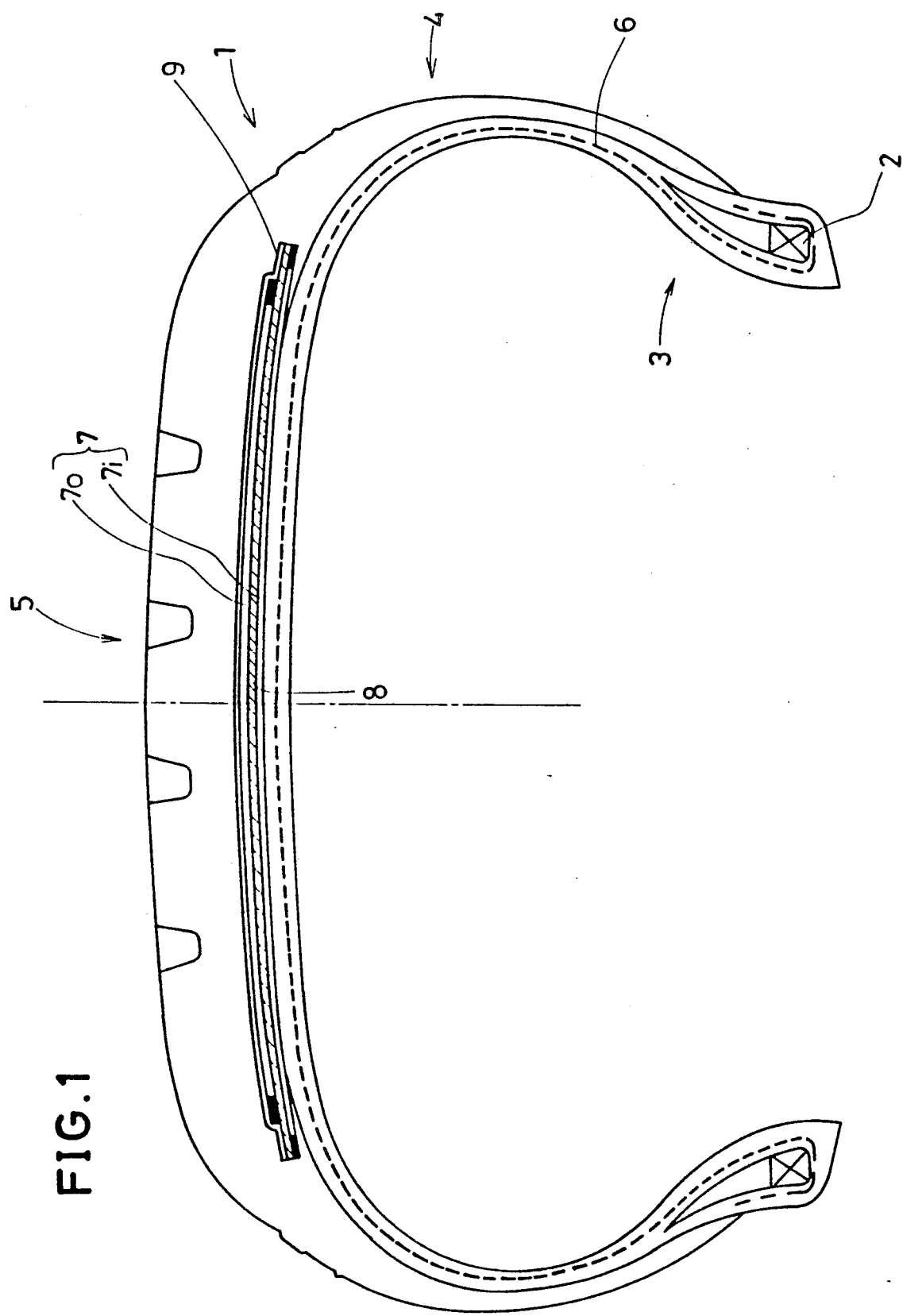
FIG. 1 is a cross sectional view showing an embodiment of the present invention.

In FIG. 1, radial tire 1 according to the present invention is a passenger car tire of size 205/60R15 having a low aspect ratio of 60%.

The tire 1 has a pair of bead portions 3, a sidewall portion 4 extending radially outwardly from each bead portion, and a tread portion extending between the radially outer edges of the sidewall portions. Further, the tire comprises a pair of bead cores 2 disposed one in each bead portion, a carcass 6 extending between the bead portions and turned up around the bead cores from the axially inside to the outside thereof, and a belt 7 disposed radially outside the carcass and radially inside a rubber tread 5.

Further, in this embodiment, an organic fiber cord layer 9 is disposed on the radially outside of the belt 7 so as to cover the whole width of the belt 7.

The carcass 6 has at least one ply of radially or semiradially arranged cords. In this embodiment, the carcass is composed of one ply of radially arranged cords. When the carcass is composed of plural plies, the carcass may include a ply turned up around the bead cores from the axially outside to the inside thereof.

Figure 2:
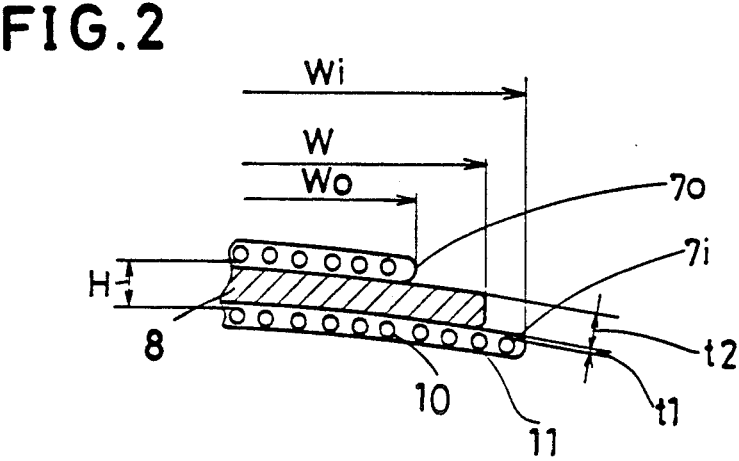
FIG. 2 is a cross sectional view showing the belt of FIG. 1.

As shown in FIG. 2, the belt 7 comprises two plies 7o and 7i of parallel steel cords 10 embedded in topping rubber 11 at an angle of 10 to 30 degrees with respect to the tire circumferential direction. Incidentally, the number of the belt plies can be increased. In other words, an additional steel belt ply or plies can be disposed in the tread portion.

In this embodiment, the belt plies 7o and 7i are laid in directions which are opposite to each other with respect the circumferential direction of the tire so that the cords in one ply cross the cords in other ply, and the width Wi of the inner ply 7i is larger than the width Wo of the outer ply 7o.

Accordingly, the circumferentially stiffness of the belt is increased to improve the hooping effect thereof, and steering stability, wear resistance, low fuel consumption performance are improved. However, bending rigidity of the belt is increased at the same time, which worsens the ride comfort.

In the present invention, therefore, a rubber damper layer 8 is disposed between the radially adjacent belt plies 7o and 7i to provide a certain distance H between the cords of one ply and the cords of the other ply. This distance H is set in the range of 2.0 to 3.0 mm. It is therefore, preferable that the damper layer 8 is formed to have a substantially constant thickness. The damper layer 8 makes bending deformation of the belt easy, and thereby ride comfort is improved while maintaining the circumferential stiffness of the belt.

As the above-mentioned distance H is not between the adjacent plies or topping rubbers and also not between the cord centers, the distance H is determined by not only the thickness t2 of the rubber damper layer 8 but also the thickness t1 of the topping rubber 11 of the belt plies 7o and 7i.

The thickness t1 of the topping rubber 11 of each belt ply 7o and 7i measured from the belt cords 10 to the ply surface is set in the range of 0.2 to 0.5 mm, and the thickness t2 of the rubber damper layer 8 is set in the range of 1.0 to 2.6 mm.

When the distance H is less than 2.0 mm, the bending rigidity of the belt is not effectively decreased, and ride comfort can not improved. When the distance H is more than 3.0 mm, the circumferential stiffness of the belt is decreased.

Further, in the belt plies one on either side of the damper layer, the width W of the damper layer 8 is not more than the width Wi of the wider ply 7i and not less than the width Wo of the narrow ply 7o, that is, Wo≦W≦Wi, whereby the distance H is kept constant at least all over the narrower ply width, and the bending rigidity of the belt is reduced all over, and the occurrence of undesirable stress and shear can be controlled.

For the damper layer 8, the same material as the topping rubber 11 can be used, but the complex elastic modulus E* of the damper layer 8 is preferably set to be less than that of the topping rubber 11.

The complex elastic modulus E* of the rubber damper layer 8 is set in the range of 50 to 75 kgf/sq.cm, and more preferably in the range of 50 to 65 kgf/sq.cm.

In the present invention, there are used, as the complex elastic modulus E*, the values measured with a viscoelastic-spectrometer made by IWAMOTO SEISAKUSYO using a 4 mm width 30 mm length specimen under the following condition: the initial strain is 10%; the amplitude is 2%; and the temperature is 70 degrees.

Figure 3:
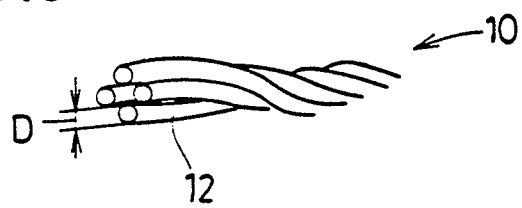
FIG. 3 is a perspective view showing the belt cord.

The above-mentioned belt cord 10 is composed of at most five metal strands 12 twisted together. In this example, the cord is composed of four steel strands each of which is a single steel filament, as shown in FIG. 3.

The diameter D of each of the metal strands 12 is set in the range of 0.10 mm to 0.22 mm. When the diameter is less than 0.10 mm, the belt can not be furnished with circumferential stiffness. When the diameter is more than 0.22 mm, the bending rigidity of the cord is excessively increased, and ride comfort can not be improved. When the number of the metal strands is more than five, the bending rigidity of the cord is undesirably increased. Preferably, the number of the strands is set to be 2 or 3 or 4.

The cord count in each belt ply is set in the range of 25 to 45 cords/5 cm in a direction at a right angle with respect to the belt cords.

When the cord count is less than 25, the belt can not have a required rigidity. When the cord count is more than 45, the bending rigidity of the belt is so increased that ride comfort is not improved.

From a point of view of compatibility of ride comfort, wear resistance, low noise, and other characteristics, it is preferable that the tread rubber 5 has a JIS(A) hardness of 45 to 57 degrees at a temperature of 20 degrees C, and a complex elastic modulus E* of 40 to 55 kgf/sq.cm.

Test tires of size 205/60R15 having the tire structure shown in FIG. 1 and specifications given in Table 1 were made and subjected to various tests.

In the tests, the tires were mounted on a 2500 cc passenger car and run on a test circuit course to evaluate tire performance by the driver's feeling using a five point method. The results are shown in Table 1, wherein the larger the value, the better the performance. Further, the results of frequency analysis of road noise during running is shown in FIG. 4.

Figure 4:
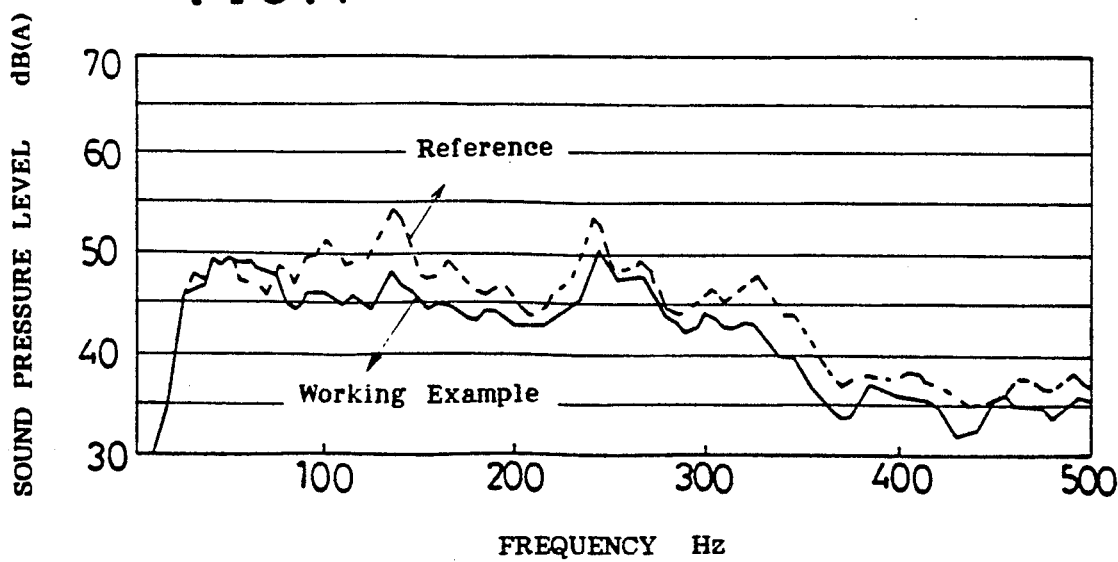
FIG. 4 is a graph showing the results of noise tests.

As shown in Table 1 and FIG. 4, the working example tire according to the present invention was superior to the reference tire in each tire performance.

Thus, in the radial tire 1 according to the present invention, the damper layer made of a relatively soft rubber is disposed between the adjacent belt plies made of relatively low modulus steel cords and the tread is made of a relatively soft rubber, whereby the belt is decreased in bending rigidity while maintaining its circumferentially stiffness. As a result, ride comfort can be improved and also running noise can be decreased.

TABLE 1

|  |  | Example | Reference |
|---|---|---|---|
| Tire size |  | 205/60R15 | 205/60R15 |
| Belt ply |  |  |  |
| Inner ply width | Wi | 164 mm | 164 mm |
| Outer ply width | Wo | 150 mm | 150 mm |
| Cord count | - | 40 cords/5 cm | 37 cords/5 cm |
| Number of strands |  | 4 | 5 |
| Diameter of strand | D | 0.22 mm | 0.26 mm |
| Distance | H | 2.0 mm | 0.8 mm |
| Damper layer |  |  |  |
| Width | W | 164 mm | — |
| Modulus | E* | 70 kgf/sq. cm | — |
| Tread rubber |  |  |  |
| JIS(A) hardness |  | 57 | 65 |
| Feeling Test Results |  |  |  |
| Shock |  | 3.5 | 3 |
| Pushing-up |  | 4.0 | 3 |
| Damping |  | 3.5 | 3 |
| Flat ride |  |  |  |
| Pushing-up |  | 3.5 | 3 |
| Damping |  | 3.5 | 3 |
| Ride comfort (Rough road) |  | 3.5 | 3 |
| Road noise |  |  |  |
| Tone |  | 3.5 | 3 |
| Loudness |  | 3.5 | 3 |
| Total |  | 3.5 | 3 |

I claim:

1. A radial tire comprising:
   a pair of bead cores disposed one in each bead portion of the tire;
   a carcass having radially arranged cords turned up around the bead cores from the axially inside to the outside thereof;
   a rubber tread disposed radially outside the carcass;
   a belt comprising a wider ply and a narrower ply disposed adjacently between the carcass and the tread,
      each belt ply comprising parallel metallic cords each composed of at most five metallic strands, each said strand having a diameter in a range of 0.10 mm to 0.22 mm,
      the cord count in each of said wider and narrower plies being in a range of 25 to 45 cords/5 cm in a direction at a right angle to the cord direction; and
   a rubber damper layer disposed between said wider and narrower plies,
      the damper layer having a substantially uniform thickness so that the distance between the cords of the wider ply and the cords of the narrower ply is in a range of 2.0 mm to 3.0 mm, the damper layer having a width being not more than the wider ply width and not less than the narrower ply width, and the complex elastic modulus (E*) of the rubber damper layer is in a range of 50 kgf/sq.cm to 75 kgf/sq.cm, when the initial strain is 10%, the amplitude is 2%, and the temperature is 70 degrees C.

2. The radial tire according to claim 1 wherein the complex elastic modulus (E*) of the tread rubber disposed radially outside the belt is in a range of 40 kgf/sq.cm to 55 kgf/sq.cm, when the initial strain is 10%, the amplitude is 2%, and the temperature is 70 degrees C., and the JIS(A) hardness of the tread rubber at a temperature of 20 degrees C. is in a range of 45 to 57.

* * * * *